United States Patent
Fautsch et al.

(10) Patent No.: US 9,186,628 B2
(45) Date of Patent: Nov. 17, 2015

(54) AIR SEPARATION MODULE WITH CLAM SHELL AXIAL SUPPORT

(71) Applicant: HONEYWELL INTERNATIONAL, INC., PATENT SERVICES M/S AB/2B, Morristown, NJ (US)

(72) Inventors: David A. Fautsch, Arlington Heights, IL (US); Michael S. Sandacz, Glen Ellyn, IL (US); Steven M. Poklop, Palatine, IL (US); Rehan Zaki, Naperville, IL (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 134 days.

(21) Appl. No.: 13/754,813

(22) Filed: Jan. 30, 2013

(65) Prior Publication Data

US 2014/0208947 A1     Jul. 31, 2014

(51) Int. Cl.
*B01D 53/22* (2006.01)
*B01D 63/02* (2006.01)
*B64D 37/32* (2006.01)

(52) U.S. Cl.
CPC .............. *B01D 63/02* (2013.01); *B01D 63/021* (2013.01); *B01D 63/022* (2013.01); *B64D 37/32* (2013.01); *B01D 53/22* (2013.01); *B01D 2256/10* (2013.01); *B01D 2256/12* (2013.01); *B01D 2313/025* (2013.01); *B01D 2313/21* (2013.01);
(Continued)

(58) Field of Classification Search
CPC ...... B01D 53/22; B01D 63/02; B01D 63/021; B01D 63/022; B01D 2256/10; B01D 2256/12; B01D 2313/025; B01D 2313/21; B01D 2313/23; B01D 2313/56; B64D 37/32; Y02T 50/44

USPC ................. 55/385.1; 95/43, 45; 96/4, 7, 8, 10
See application file for complete search history.

(56) References Cited

U.S. PATENT DOCUMENTS

| | | | |
|---|---|---|---|
| 3,339,341 A | 9/1967 | Maxwell et al. |
| 4,265,763 A | 5/1981 | Bollinger et al. |
| 4,367,139 A | 1/1983 | Graham |

(Continued)

FOREIGN PATENT DOCUMENTS

| | | |
|---|---|---|
| DE | 3032417 A1 | 4/1982 |
| DE | 9300929 U1 | 4/1993 |

(Continued)

OTHER PUBLICATIONS

"tack welding", Collins English Dictionary—Complele and Unabridged HarperCollins Publishers 1991, 1994, 1998, 2000, 2003, 1 page, http://www.thefreedictionary.com.tack+welding.*

(Continued)

*Primary Examiner* — Jason M Greene
*Assistant Examiner* — Anthony Shumate
(74) *Attorney, Agent, or Firm* — Shimokaji IP (57) ABSTRACT

An air separation module includes a housing, a bundle of hollow fiber membranes, and a clam shell axial support assembly. The axial support assembly includes two supportive elements, each supportive element including a flow-through component. The flow-through component includes a plurality of openings through which a supply of fluid (e.g. oxygen enriched air) may pass. The axial support assembly is secured around the bundle of hollow fiber membranes at a position radially inward from the housing and radially outward from the fiber bundle.

11 Claims, 6 Drawing Sheets

(52) U.S. Cl.
  CPC ......... *B01D 2313/23* (2013.01); *B01D 2313/56* (2013.01); *Y02T 50/44* (2013.01)

(56) References Cited

U.S. PATENT DOCUMENTS

| | | | |
|---|---|---|---|
| 4,517,720 A | | 5/1985 | Otstot et al. |
| 4,808,378 A | * | 2/1989 | Nakanishi et al. ............... 422/48 |
| 5,209,848 A | * | 5/1993 | Jeanes et al. .................. 210/490 |
| 5,211,728 A | * | 5/1993 | Trimmer ........................... 95/47 |
| 5,282,964 A | | 2/1994 | Young et al. |
| 5,464,535 A | | 11/1995 | Shettigar |
| 6,210,464 B1 | * | 4/2001 | Nakanishi et al. ................ 95/52 |
| 6,461,408 B2 | * | 10/2002 | Buxbaum ........................ 95/55 |
| 6,755,894 B2 | | 6/2004 | Bikson et al. |
| 6,951,611 B2 | | 10/2005 | Dannenmaier et al. |
| 7,387,730 B2 | * | 6/2008 | Nakahara et al. .......... 210/321.8 |
| 7,662,268 B2 | * | 2/2010 | Chuang ........................ 204/556 |
| 7,867,319 B2 | * | 1/2011 | Zaki et al. ......................... 95/45 |
| 8,182,592 B2 | | 5/2012 | Nakamura et al. |
| 2001/0035374 A1 | | 11/2001 | Yamamoto et al. |
| 2004/0211726 A1 | | 10/2004 | Baig et al. |
| 2005/0126978 A1 | | 6/2005 | Cote et al. |
| 2005/0126982 A1 | | 6/2005 | Stachera et al. |
| 2008/0072685 A1 | * | 3/2008 | Chuang ..................... 73/861.08 |
| 2008/0128348 A1 | * | 6/2008 | Blum ............................ 210/251 |
| 2009/0246429 A1 | | 10/2009 | Zaki et al. |
| 2010/0024649 A1 | | 2/2010 | Semmere et al. |
| 2010/0106072 A1 | * | 4/2010 | Kashefi-Khorasani et al. ............................ 604/5.04 |
| 2010/0300294 A1 | | 12/2010 | Clinton et al. |
| 2011/0146492 A1 | | 6/2011 | Dopkins et al. |
| 2011/0290709 A1 | | 12/2011 | Ohno et al. |
| 2015/0004074 A1 | * | 1/2015 | Lesniak et al. ................ 422/220 |

FOREIGN PATENT DOCUMENTS

| | | |
|---|---|---|
| DE | 4438327 C1 | 3/1996 |
| EP | 0371189 A2 | 6/1990 |
| WO | 0132299 A1 | 5/2001 |
| WO | 2006087214 A2 | 8/2006 |
| WO | 2012170956 A1 | 12/2012 |

OTHER PUBLICATIONS

European Search Report in EP Application No. EP14152362.1 dated Apr. 11, 2014, 4 pages.

* cited by examiner

AIR SEPARATION MODULE WITH CLAM SHELL AXIAL SUPPORT

BACKGROUND OF THE INVENTION

The present invention generally relates to gas generating systems, such as on-board inert gas generating systems (OBIGGS) and, more particularly, to air separation modules (ASM) for gas generating systems.

The Federal Aviation Agency (FAA) has issued safety mandates requiring that all new and existing aircraft inert the fuel tank to prevent explosions. One accepted method of fuel tank inerting is the OBIGGS. Aircraft have used the OBIGGS to protect against fuel tank explosions by replacing the potentially explosive fuel vapor/air mixture above the fuel in the ullage space of the tanks with nitrogen enriched air (NEA).

A key component of the OBIGGS is the ASM. The ASM may be configured to receive air, such as bleed air, and to provide a NEA flow to inert the fuel tank and an oxygen enriched air (OEA) flow. The OEA flow can be recaptured or vented overboard.

The ASM can include a housing having an inlet to receive air (e.g. bleed air), a NEA outlet and an OEA outlet. The ASM may include a bundle of hollow fiber membranes positioned within the housing. At least one end of the fiber bundle may be cast or potted in what is commonly referred to as a tubesheet. More commonly, both ends of the fiber bundle may be so encapsulated with the tubesheet. The tubesheets may serve to hold the fibers in a fluid-tight relationship such that the NEA flow may be isolated from the OEA flow. An inner tube, such as the inner tube described in US Patent Application 2010/0024649 A1, may be included within the fiber bundle to provide axial support.

The ASM utilizes membrane technology to separate oxygen from air. During operation, air may enter the housing through the inlet and pass through the bundle of hollow fiber membranes. Oxygen may be separated from the air flow due to diffusion through the fiber walls because the fiber walls may be more permeable to oxygen than to nitrogen. As the air flow travels through the ASM, the NEA flow may be generated by the loss of oxygen via permeation through the fiber wall. The NEA flow may exit the housing through the NEA outlet and the OEA flow may exit through the OEA outlet. Typically, an NEA oxygen concentration of 12% or less is sufficient to inert the fuel tank.

In fuel tank inerting systems, the amount of NEA flow may be the key performance metric. Higher NEA flow per size and weight of ASM translate into lower the OBIGGS size and weight. Further, it is desirable that the ASM have a long maintenance interval to reduce cost and delays associated with the servicing of the ASM.

As can be seen, there is a need to increase the NEA flow of the ASM. Further, there is a need to reduce the weight, size and maintenance interval of the ASM.

SUMMARY OF THE INVENTION

In one aspect of the present invention, an apparatus for insertion into a housing structure having a housing shell, the apparatus comprises a potted bundle positionable within the housing structure, the potted bundle including a fiber bundle and at least one tubesheet; and an axial support assembly positioned around the potted bundle radially outward from the fiber bundle and radially inward from the housing shell when the apparatus is inserted into the housing structure.

In another aspect of the present invention, an apparatus for insertion into a housing structure, the apparatus comprises a fiber bundle having a plurality of hollow fiber membranes; a tubesheet in contact with the fiber bundle, the tubesheet including a support coupling groove; and two supportive elements positioned between the fiber bundle and the housing structure, each supportive element in contact with the support coupling groove.

In a further aspect of the present invention, a method of supporting a fiber bundle comprises the steps of potting each end of the fiber bundle to provide a potted bundle having one tubesheet adjacent each end of the fiber bundle; positioning an axial support assembly around the potted bundle to form a supported fiber bundle assembly; securing portions of the supported fiber bundle assembly together; and positioning at least one o-ring in physical contact with the tubesheet.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, the present invention provides ASMs and methods for producing the same. Embodiments of the present invention may find beneficial use in industries such as the aerospace, gas separation, microfiltration, and ultrafiltration. Embodiments of the present invention may be useful in applications including OBIGGS for inerting fuel tanks. Embodiments of the present invention may be useful in any filtration or gas separation application including, but not limited to, OBIGGS for aircraft.

Figure 1:
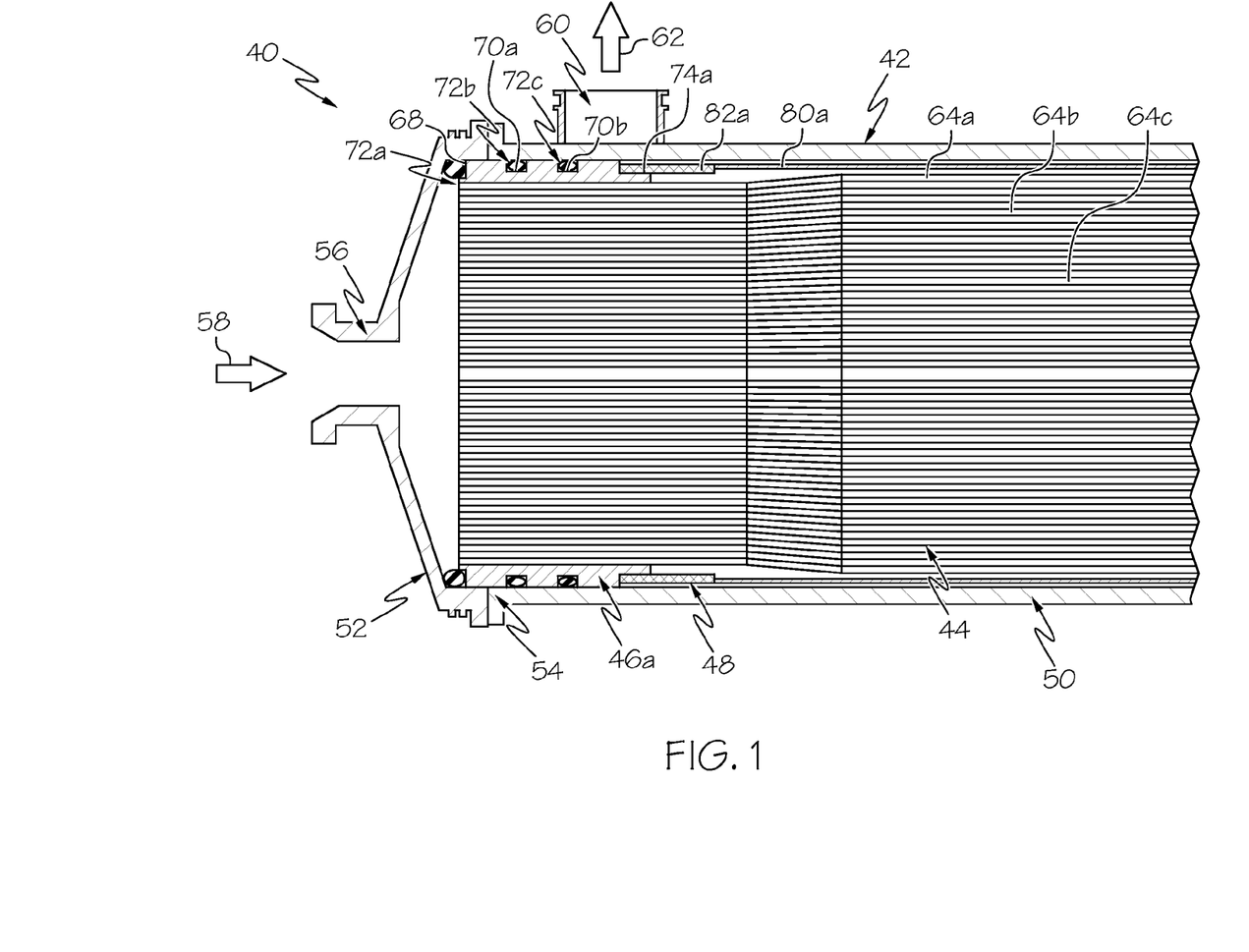
FIG. 1 is a cross sectional view of a portion of an air separation module according to one embodiment of the present invention.

An air separation module (ASM) 40, according to an embodiment of the present invention is shown in FIG. 1. The ASM 40 may include a housing structure 42, a fiber bundle 44, at least one tubesheet 46a, 46b (see FIGS. 2-3), and an axial support assembly 48.

The housing structure 42 may include a housing shell 50, a first endcap 52 and a second endcap (not shown). The housing shell 50 may be cylindrical in shape. The first endcap 52 may be positioned adjacent a first end 54 of the shell 50 and the second endcap may be positioned adjacent a second end (not shown) of the shell 50.

The first endcap 52 may include an inlet element 56. The inlet element 56 may be adapted to receive a supply of gas 58, such as a supply of bleed air. For some embodiments, the inlet element 56 may be in flow communication with an aircraft engine (not shown). The inlet element 56 may be adapted such that during operation of the ASM 40 the supply of gas 58 may enter the ASM 40 through the inlet element 56.

The housing shell 50 may include an outlet element 60, such as an oxygen enriched air (OEA) outlet. The outlet element 60 may be adapted such that during operation of the ASM 40 a supply of OEA 62 may exit the ASM 40 through the outlet element 60.

The second endcap may include an outlet (not shown), such as a nitrogen enriched air (NEA) outlet. The NEA outlet may be adapted such that during operation of the ASM 40 a supply of NEA (not shown) may exit the ASM 40 through the NEA outlet. The NEA outlet may be in flow communication with an aircraft fuel tank (not shown).

The housing structure 42 may comprise metal. For some applications, the housing structure 42 may include 12-gauge stainless steel. For some applications, the housing structure 42 may include aluminum.

The housing structure 42 may be embedded on an aircraft (not shown). The housing structure 42 may be configured to enclose the fiber bundle 44, the tubesheets 46a, 46b and the axial support assembly 48.

The fiber bundle 44 may be inserted into the housing structure 42. The fiber bundle 44 may include a plurality of hollow fiber membranes 64a, 64b, 64c. Hollow fiber membranes 64a, 64b, 64c are known in the art and may include polymers such as polyimide. Useful hollow fiber membranes 64a, 64b, 64c may include the membranes described in U.S. patent application Ser. No. 12/641,787 filed on Dec. 18, 2009, which is incorporated herein by reference. Each hollow fiber membrane 64a, 64b, 64c may include a bore (not shown) that extends in a fluid communication relationship through the tubesheets 46a, 46b.

The tubesheets 46a, 46b are known in the art and may include polymers, such as thermoset polymers. Useful tubesheets 46a, 46b may include the filled epoxy tubesheets described in U.S. Pat. No. 7,867,319, which is incorporated herein by reference. Filled epoxy tubesheets may comprise an epoxy filled with a metal, such as aluminum flakes. The fiber bundle 44 may be potted such that one tubesheet 46a, 46b is positioned at or adjacent each end of the fiber bundle 44 forming a potted bundle 66 (see FIG. 3).

Each tubesheet 46a, 46b may include a face seal groove 68 and at least one radial seal groove 70a, 70b, 70c, 70d. Each seal groove 68, 70a, 70b, 70c, 70d may be configured to receive an o-ring 72a, 72b, 72c. During assembly of the ASM 42, the o-rings 72a, 72b, 72c may be positioned between the tubesheet 46a, 46b and the housing structure 42 to form fluid-tight compression seals so that when the supply of gas 58 passes through the housing structure 42, the ASM 40 can isolate the supply of NEA from the supply of OEA 62. Each tubesheet 46a, 46b also may include a support coupling groove 74a, 74b adapted to engage a portion of the axial support assembly 48.

The axial support assembly 48 may be positioned around the fiber bundle 44. The axial support assembly 48 may be positioned radially inward from the housing shell 50 when the axial support assembly 48 is inserted into the housing structure 42 and radially outward from the fiber bundle 44. In other words, the axial support assembly 48 may be between the housing shell 50 and the fiber bundle 44.

The axial support assembly 48 may be cylindrical. The inner diameter of the axial support assembly 48 may be greater than the outer diameter of the fiber bundle 44 to reduce damage to the hollow fiber membranes 64a, 64b, 64c due to contact with the axial support assembly 48. For some embodiments, the inner diameter of the axial support assembly 48 may be at least about 1/16 inch greater than the outer diameter of the fiber bundle 44. The outer diameter of the axial support assembly 48 may be less than the inner diameter of the housing shell 50. For some embodiments, the outer diameter of the axial support assembly 48 may be about 1/16 inch less than the inner diameter of the housing shell 50 to maintain flow while minimizing packaging.

Figure 2:
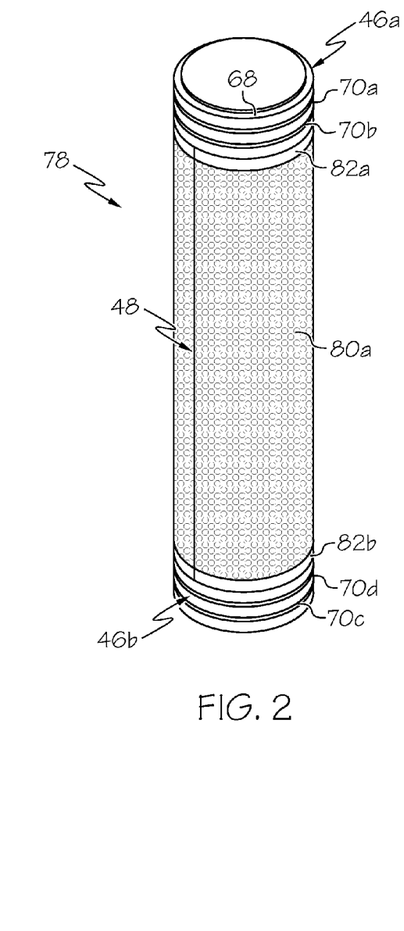
FIG. 2 is a perspective view of a supported fiber bundle assembly according to one embodiment of the present invention.
Figure 3:
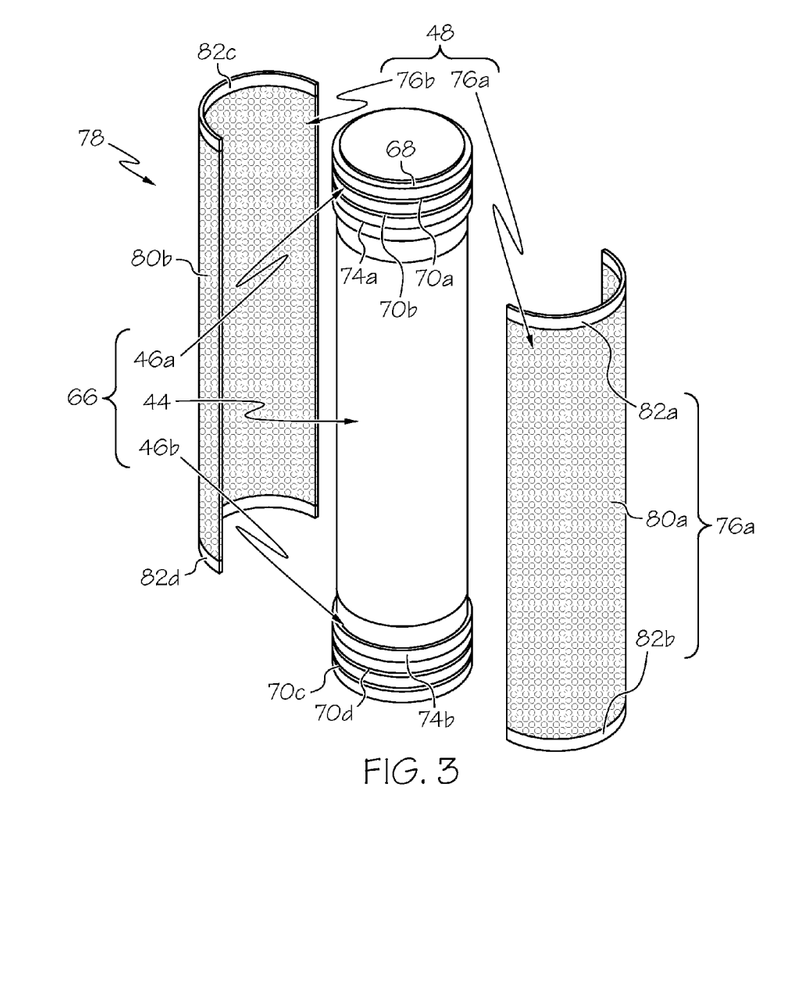
FIG. 3 is an exploded view of FIG. 2.

The axial support assembly 48 may comprise two supportive elements 76a and 76b configured to fit over the hollow-fiber section of the potted bundle 66 to form a supported fiber bundle assembly 78, as shown in FIGS. 2 and 3. For some embodiments, the supportive element 76a, 76b may be U-shaped or half circular shaped. The supportive element 76a, 76b may include a flow-through component 80a, 80b. The supportive element 76a, 76b also may include one tubesheet coupling component 82a, 82b, 82c, 82d positioned at each end of the flow-through component 80a, 80b.

Figure 4:
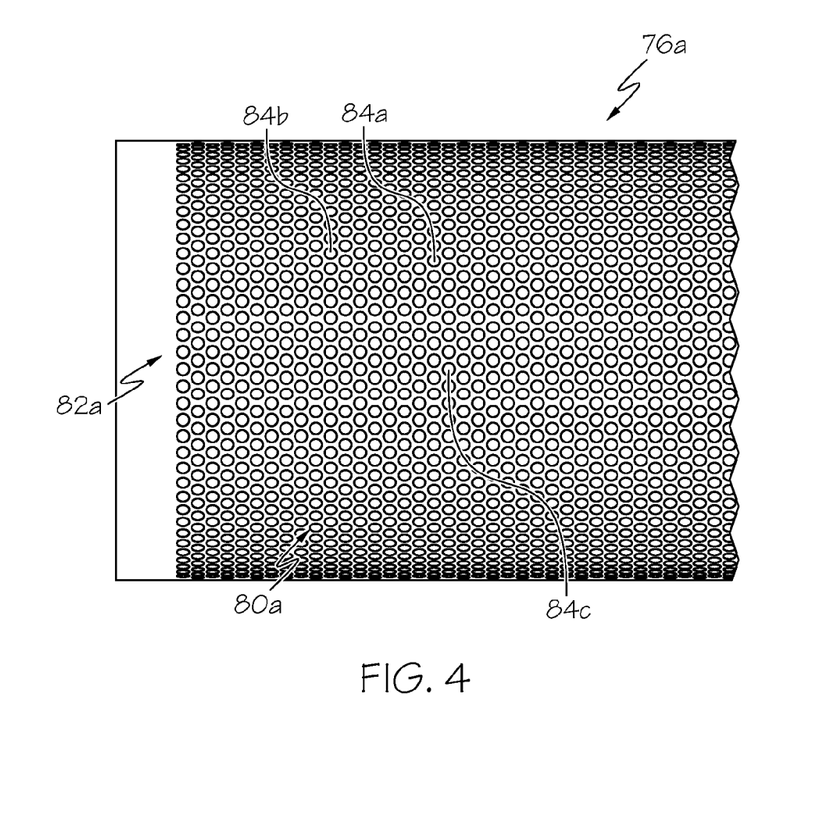
FIG. 4 is a top perspective view of a portion of a supportive element according to one embodiment of the present invention.
Figure 5:
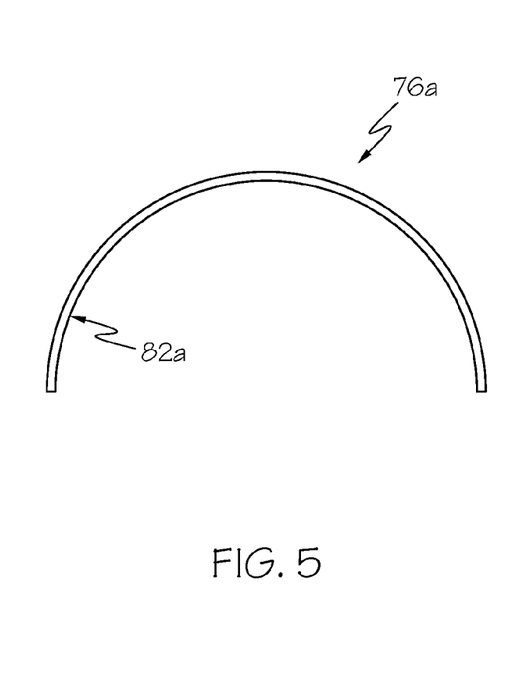
FIG. 5 is an end plan view of FIG. 4.
Figure 6:
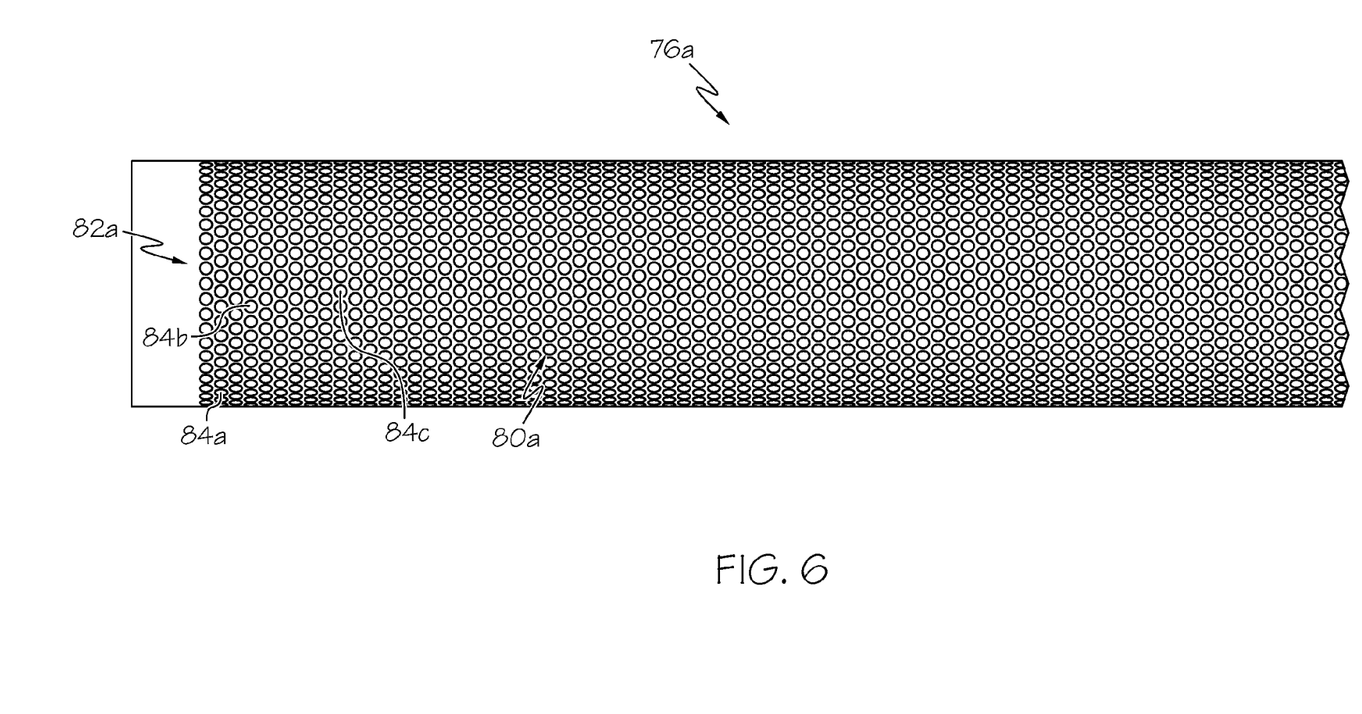
FIG. 6 is a side perspective view of FIG. 4.

Referring to FIGS. 4-6, the flow-through component 80a may include a plurality of openings 84a, 84b, 84c. The openings 84a, 84b, 84c may be adapted to provide fluid communication through the flow-through component 80a. In other words, a fluid, such as the supply of OEA 62, may pass through the flow-through component 80a via the openings 84a, 84b, 84c during operation of the ASM 42. The openings 84a, 84b, 84c may be any shape. For example, the shape of the opening 84a, 84b, 84c may include, but is not limited to, ovals, circles, squares and slots.

Figure 7:
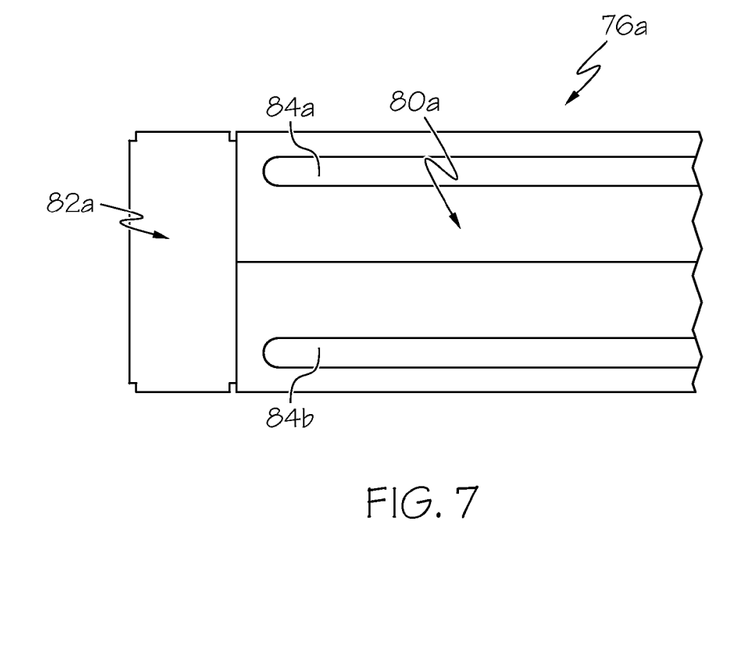
FIG. 7 is a top plan view of a portion of a supportive element according to another embodiment of the present invention.
Figure 8:
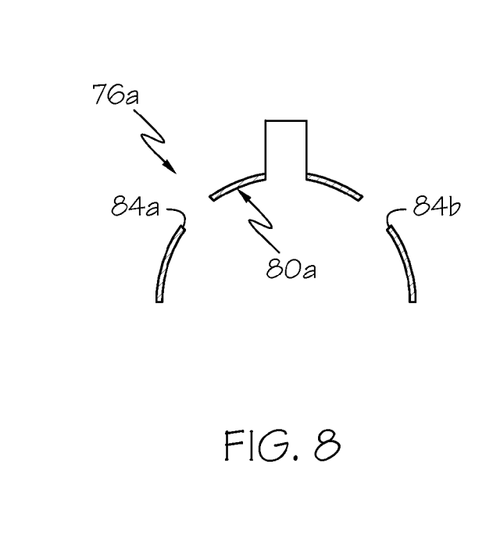
FIG. 8 is a cross-section view of FIG. 7.

For some embodiments, the flow-through component 80a may comprise a rolled strip of a perforated plate and the openings 84a, 84b, 84c may comprise holes, such as 3/16 inch diameter holes on 1/4 inch staggered pitch, as shown in FIGS. 4 and 6. For some embodiments wherein the openings 84a, 84b, 84c comprise holes, the diameter of the holes may be between about 0.062 inches and about 0.750 inches. For some embodiments, the flow-through component 80a may comprise a rolled strip of slotted plate and the openings 84a, 84b may comprise a plurality of circumferentially spaced apart longitudinal slots, as shown in FIGS. 7-8.

The open area (combined area of the openings 84a, 84b, 84c) of the flow-through component 80a, 80b may vary with application and may be determined by the size and spacing of the openings 84a, 84b, 84c. For example, when the openings 84a, 84b, 84c comprise 3/16 inch diameter holes on 1/4 inch staggered pitch, the open area may be about 51% of the flow-through component 80a, 80b. Pressure drop across the flow-through component 80a, 80b may be minimized and component strength may be maintained by adjusting the percentage of open area of the flow-through component 80a, 80b. For some embodiments, the open area may be between about 20% and about 60% of the flow-through component 80a, 80b.

The tubesheet coupling components 82a, 82b, 82c, 82d may provide collar-like structures on the ends of the flow-through component 80a, 80b. Each tubesheet coupling component 82a, 82b, 82c, 82d may comprise a strip of solid plate. The tubesheet coupling component 82a, 82b, 82c, 82d may be configured to engage the support coupling groove 74a, 74b of the tubesheet 46a, 46b.

The axial support assembly 48 may be placed over the fiber bundle 44 while the bundle is being handled during the fabrication process (potting and coating stages). The tubesheet coupling component 82a, 82b, 82c, 82d of the axial support assembly 48 may be positioned in contact with the tubesheet 46a, 46b after the fiber bundle 44 is potted. Tubesheet cracking due to potting the axial support assembly 48 in conjunction with the fiber bundle 44 and integral with the tubesheet 46a, 46b may be eliminated. Tubesheet cracking resulting from differential thermal expansion of the tubesheet 46a, 46b and the axial support assembly 48 can be avoided. Also, the axial support assembly 48 provides rigidity for the fiber bundle 44 and prevents collapse of the fiber bundle 44 during normal operation.

Tubesheet cracking is a potential failure mode because once cracked, air starts leaking through the cracks, bypassing the membrane and mixing with the NEA, and therefore the desired concentration of nitrogen cannot be achieved. Leakage through the tubesheet 46a, 46b results in a reduction in separation selectivity of the ASM 40 and drastically affects the ASM's overall performance.

The tubesheet coupling components 82a, 82b, 82c, 82d may be trimmed to provide adjustability to the axial support assembly 48 should the fiber bundle 44 shrink during the manufacturing or in service. The tubesheet coupling components 82a, 82b, 82c, 82d may be trimmed to adjust the length of the axial support assembly 48. For example, the fiber bundle 44 may be measured after potting and fiber shrinkage. The tubesheet coupling components 82a, 82b, 82c, 82d then may be trimmed to provide an axial support assembly 48 of the desired length.

For some embodiments, the tubesheet coupling component 82a, 82b, 82c, 82d may be welded to the flow-through component 80a, 80b. For some embodiments, the tubesheet coupling component 82a, 82b, 82c, 82d may be integral to the flow-through component 80a, 80b. For example, the supportive element 76a, 76b may be formed by starting with a solid plate and punching holes (openings 84a, 84b, 84c) in the center section. This single piece could be rolled into the U-shape (or half circular shape) and thus would be considered one-piece construction.

During assembly, two supportive elements 76a, 76b may be placed over the hollow-fiber section of the potted bundle 66 and secured together. For some embodiments, the supportive elements 76a, 76b may be tack-welded along the longitudinal seam. Alternatively, hose clamps (not shown) or metal rings (not shown) may be used to secure the elements 76a, 76b of the axial support assembly 48 together.

By placing the axial support assembly 48 on the outside instead of the inside of the fiber bundle 44, a more compact fiber bundle design may be achieved because there may be more room available within the fiber bundle 44 to pack extra hollow fiber membranes 64a, 64b, 64c. For example, a 1 inch outside diameter tube consumes about 15% of the volume of a 6 inch outside diameter ASM 40 when placed within the fiber bundle 44. By placing the axial support assembly 48 outside the fiber bundle 44 this 15% may be available for additional hollow fiber membranes 64a, 64b, 64c. The additional hollow fiber membranes 64a, 64b, 64c allows for a higher surface area to be achieved which leads to higher product flow for a similar sized fiber bundle 44 with an internal axial support. The higher product flow for the fiber bundle 44 allows for the ASM 40 to be optimized for higher product flow while minimizing the spatial and weight impact on the OBIGGS.

Figure 9:
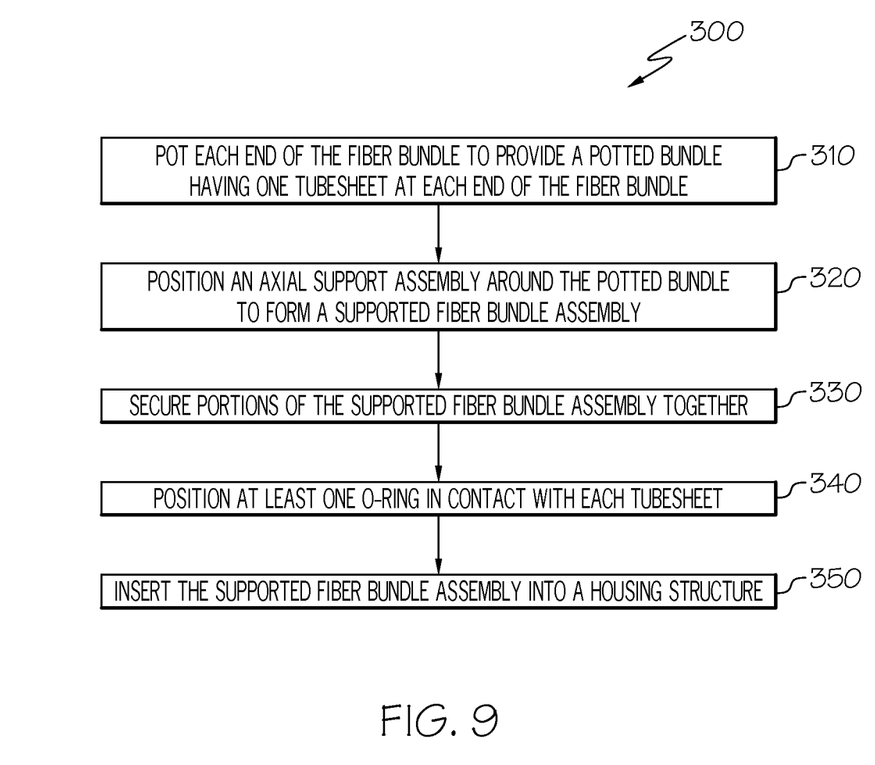
FIG. 9 is a flow chart of a method of supporting a fiber bundle according to an embodiment of the present invention.

Referring to FIG. 9, a method 300 of supporting a fiber bundle 44 according to one embodiment of the present invention is shown. The method 300 may include a step 310 of potting each end of the fiber bundle 44 to provide a potted bundle 66 having one tubesheet 46a, 46b at each end of the fiber bundle 44. In step 320 an axial support assembly 48 is positioned around the potted bundle 66 to form a supported fiber bundle assembly 78. In step 330 portions of the supported fiber bundle assembly 78 are secured together. In step 340 at least one o-ring is positioned in contact with each tubesheet 46a, 46b; and in step 350 the supported fiber bundle assembly 78 is inserted into a housing structure 42.

The step 310 of potting each end of the fiber bundle 44 to provide a potted bundle 66 may include wetting the fiber bundle 44 with a first portion of preheated filled epoxy (not shown) and potting the fiber bundle 44 with a second portion of filled epoxy (not shown).

The step 320 of positioning an axial support assembly 48 around the potted bundle 66 to form a supported fiber bundle assembly 78 may include adjusting the length of the axial support assembly 48 by trimming the tubesheet coupling components 82a, 82b, 82c, 82d so that the tubesheet coupling components 82a, 82b, 82c, 82d of the axial support assembly 48 engages the support coupling groove 74a, 74b of the tubesheet 46a, 46b.

The step 330 of securing portions of the supported fiber bundle assembly 78 together may include tack welding the supportive elements 76a, 76b together. Alternatively, the step 330 of securing portions of the supported fiber bundle assembly 78 together may include securing the supportive elements 76a, 76b together with hose clamps (not shown). As another alternative, the step 330 of securing portions of the supported fiber bundle assembly 78 together may include positioning at least one metal ring (not shown) around the axial support assembly 48 to secure the supportive elements 76a, 76b together. For some embodiments, the step 330 of securing portions of the supported fiber bundle assembly 78 together may include positioning three metal rings around the axial support assembly 48.

The step 340 of positioning at least one o-ring in contact with each tubesheet 46a, 46b of the supported fiber bundle assembly 78 may include positioning the o-ring 72a, 72b, 72c in a radial seal groove 70a, 70b, 70c, 70d. The step 340 of positioning at least one o-ring in contact with each tubesheet 46a, 46b of the supported fiber bundle assembly 78 may include positioning the o-ring 72a, 72b, 72c in a face seal groove 70a, 70b, 70c, 70d. The step 340 of positioning at least one o-ring in contact with each tubesheet 46a, 46b may include positioning at least one o-ring in physical contact with the tubesheet 46a, 46b.

The step 350 of inserting the supported fiber bundle assembly 78 into a housing structure 42 may include forming at least one fluid-tight compression seal between each tubesheet 46a, 46b and the housing structure 42.

EXAMPLE

Each end of a fiber bundle 44 was potted separately (potting refers to the process of casting the end of the fibers with epoxy into a mold and cured to form the tubesheet 46a, 46b). After an optional coating step, the external axial support 48 was placed outside the potted bundle 66 to provide rigidity to the bundle. Radial o-rings were installed on the tubesheet 46a, 46b at both ends and the bundle was slid into an ASM housing shell 50. An o-ring 72a was also placed at each end of the tubesheet bundle to provide a face seal between the housing flanges and tubesheet bundle. Once the flanges were tightened against the face seal, the ASM assembly was complete. The axial support design was optimized for axial strength, stiffness for o-ring compression seal, and flow from the hollow fibers 64a, 64b, 64c to the oxygen outlet (OEA outlet).

As can be appreciated by those skilled in the art, embodiments of the present invention can reduce the size and weight of the ASM 40 by incorporating the axial support assembly 48 outside the fiber bundle 44. By positioning the axial support assembly 48 outside the fiber bundle 44, the NEA flow can be increased by increasing the number of hollow fiber membranes 64a, 64b, 64c.

It should be understood, of course, that the foregoing relates to exemplary embodiments of the invention and that modifications may be made without departing from the spirit and scope of the invention as set forth in the following claims.

We claim:

1. An apparatus, comprising:
    a housing structure;
    a potted bundle within said housing structure, said potted bundle including a fiber bundle of hollow fiber membranes and a tubesheet at one end of the fiber bundle;
    an inlet element affixed to, and for fluid communication into, said housing structure, said inlet element adjacent said one end of said fiber bundle;
    an outlet element affixed to, and for fluid communication out of, said housing structure, said outlet element positioned directly opposite of and radially opposite from said tubesheet;
    an axial support assembly positioned around said potted bundle, radially outward from said fiber bundle, radially inward from said housing structure;
    an o-ring positioned between said housing structure and said tubesheet,
    wherein the tubesheet includes a support coupling groove,
    wherein a tubesheet coupling component of the axial support assembly is engaged in the support coupling groove, wherein said tubesheet coupling component has a flat, collar configuration;
    wherein said support coupling groove and tubesheet coupling component are directly opposite of and radially opposite from an opening of said outlet element.

2. The apparatus of claim 1, wherein said axial support assembly includes two supportive elements.

3. The apparatus of claim 1, wherein said axial support assembly includes a plurality of openings.

4. The apparatus of claim 1, wherein said axial support assembly includes a flow-through component and the tubesheet coupling component.

5. The apparatus of claim 1, wherein said axial support assembly includes a plurality of circumferentially spaced apart longitudinal slots.

6. The apparatus of claim 1, wherein said tubesheet includes an epoxy filled with metal flakes.

7. The apparatus of claim 1, wherein said axial support assembly includes a rolled strip of a perforated plate.

8. An apparatus, comprising:
    a housing structure having an inside diameter;
    an inlet element affixed to the housing structure;
    an outlet element affixed to the housing structure;
    a fiber bundle having a plurality of hollow fiber membranes;
    a tubesheet positioned radially opposite from said outlet element and in contact with an end of said fiber bundle;
    wherein said fiber bundle has, opposite from said tubesheet, a first radius and has, distal from said tubesheet, a second radius, wherein said first radius is smaller than said second radius;
    two supportive elements positioned between said fiber bundle and said housing structure,
    wherein at least one of said two supportive elements has a flow-through component;
    wherein said two supportive elements have a combined outside diameter that is less than said inside diameter of said housing structure,
    wherein a differential between said outside diameter and said inside diameter enables fluid to flow from said flow-through component to said outlet element.

9. The apparatus of claim 8, wherein each supportive element includes a tubesheet coupling component, said flow-through component is integral to said tubesheet coupling component.

10. The apparatus of claim 8, wherein said supportive elements are secured together.

11. The apparatus of claim 8, wherein said tubesheet includes a face seal groove.

* * * * *